United States Patent [19]

Mönch

[11] Patent Number: 5,067,347

[45] Date of Patent: Nov. 26, 1991

[54] METHOD AND APPARATUS FOR TESTING A PNEUMATIC TIRE

[75] Inventor: Uwe Mönch, Bensheim, Fed. Rep. of Germany

[73] Assignee: Gebr. Hofmann GmbH & Co. KG Maschinenfabrik, Pfungstadt, Fed. Rep. of Germany

[21] Appl. No.: 554,402

[22] Filed: Jul. 19, 1990

[30] Foreign Application Priority Data

Sep. 29, 1989 [DE] Fed. Rep. of Germany ....... 3932674

[51] Int. Cl.⁵ ............................................. G01M 17/02
[52] U.S. Cl. ..................................... 73/146; 73/146.5; 374/143
[58] Field of Search ..................... 73/146, 146.8, 146.3, 73/146.5; 137/227, 223, 224, 334; 222/3; 374/143

[56] References Cited

U.S. PATENT DOCUMENTS 4,916,943  4/1990  Himmler et al. ....................... 73/146

Primary Examiner—Donald O. Woodiel
Attorney, Agent, or Firm—Cushman, Darby & Cushman

[57] ABSTRACT

In a method and an apparatus for testing a pneumatic tire such as for testing the uniformity thereof, a tire to be tested is inflated to a given pressure and rolled against a test surface at a tire contact patch, and forces and/or moments acting at the contact patch are measured. To at least reduce the period of time required for the tire to warm up for a testing operation, the compressed air used to inflate the tire is heated to a given temperature before being passed into the interior of the tire. The compressed air may be heated as it flows through a supply conduit, under the control of a sensor for sensing the temperature in the tire.

14 Claims, 1 Drawing Sheet

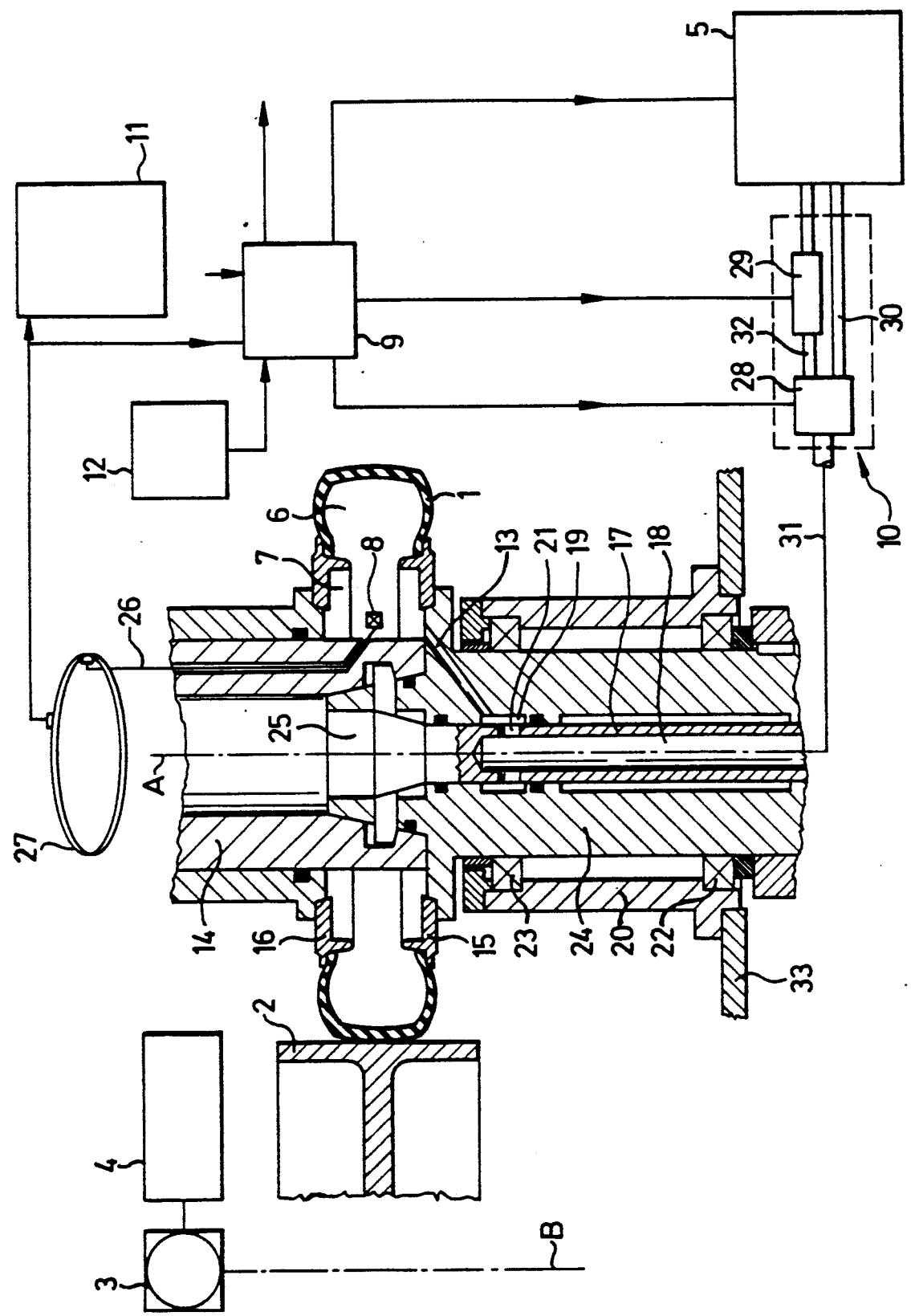

METHOD AND APPARATUS FOR TESTING A PNEUMATIC TIRE

BACKGROUND OF THE INVENTION

Modern pneumatic tires and in particular those intended for use on motor vehicles are subjected nowadays to ever increasing levels of stress under normal conditions of operation of such a vehicle. For that reason, there is often a requirement to subject a tire to testing operations to ensure inter alia that it can meet certain standards.

One process for testing a pneumatic tire such as a motor vehicle tire involves inflating the tire to be tested to a specified air pressure and then rolling the tire against a test surface such as a test drum or a pressure wheel, with the area of contact between the tire and the test surface constituting a tire contact patch. The forces and moments which act at the tire contact patch can thus be measured. The measured forces and moments may for example provide information about the uniformity of the tire, as referred to for example in 'Werkstatt und Betrieb', 31st year, Issue No. 3, pages 183-188. In addition, in particular in order to test the operational reliability of a tire, it is possible to simulate various combinations of loadings and tests in respect of operational strength can be carried out under different accumulations of loadings, by presetting certain test parameters for carrying out the testing procedure. The required measurements may be attained by means of measuring hub assemblies (reference may be made in this respect to Hofmann News 4).

Before it is possible to begin the actual measuring procedure, it may be necessary in at least some cases to ensure that the tire is properly warmed up and has thus reached a temperature which at least approximately corresponds to its normal operating temperature. That is intended to ensure that the tire is operated in the test procedure under conditions which are close to those involved in a practical context, while possibly also providing that the measuring apparatus is at the appropriate temperature to provide for the properly established characteristics thereof in regard to temperature, for example when using a measuring hub assembly with strain gauges, which is disposed at the axis of the tire for supporting same during the test run. To achieve that aim, the tire may be heated up by rolling it against the test surface, thus simulating the situation where a tire is fitted in a practical context to a motor vehicle and rolls against the road surface when the vehicle begins to move. At the end of that heating time, the actual operation of measuring the forces and moments involved during the test run can then be dealt with. The heating time may be up to for example around two minutes, depending on the speed of tire rotation involved. It will be appreciated however that heating up the tire in that way means that the total testing time during which the tire to be tested is in the tire testing machine is considerably increased. In addition, it has not been possible hitherto to provide for properly controlled heating of the tire in that way.

On the other hand however, at high speeds of rotation, during a measuring run, the tire may be subjected to an excessively strong heating effect, in particular when carrying out high-speed testing in regard to establishing the operational reliability of a pneumatic tire.

SUMMARY OF THE INVENTION

An object of the present invention is to provide a method of testing a pneumatic tire in which the overall testing time for which the tire is subjected to a testing procedure can be reduced in comparison with previous methods.

Another object of the invention is to provide a pneumatic tire testing method which includes ways of providing for a properly controlled and monitored tire temperature during a test run.

Still another object of the present invention is to provide a pneumatic tire testing method which includes a temperature compensation factor in order to afford enhanced measuring accuracy.

A still further object of the present invention is to provide an apparatus for testing a pneumatic tire, at a substantially better controlled temperature thereof.

In accordance with the present invention, in a first aspect, these and other objects are achieved by a method of testing a pneumatic tire wherein the tire to be tested is inflated to a given inflation pressure, the air for inflating the tire being set to a given temperature prior to being introduced into the interior of the tire to inflate same. The inflated tire is then rolled against a test surface at a tire contact patch and at least one of the forces and moments acting at the tire contact patch during the measuring run is measured.

In that way it is possible for the testing temperature to be incorporated as an additional parameter in testing the pneumatic tire, for example for testing the operational strength thereof. That gives an additional and important component in regard to testing the operational reliability of a pneumatic tire. In order to provide adaptation to the widely varying temperature conditions which can occur in a practical context, it is possible to choose temperatures within a very wide range, for example from −10° through +100° C., for the testing temperature. In particular keeping the testing temperature constant ensures that when using strain gauges for the measuring arrangement or when using other measurement value generators which may be sensitive to temperature, the measurement signals obtained thereby are, at least substantially, independent of temperature.

It will be seen, therefore, that it is possible to provide that the tire in the inflated condition is heated to a temperature corresponding to practical situations when the tire is used, for example, on a motor vehicle. Furthermore, the time required for bringing the tire up to the proper operating temperature can be considerably reduced or completely eliminated as the tire can be set to the temperature required for the testing operation by virtue of the introduction of heated compressed air into the interior of the tire for inflating same. The overall testing time is, therefore, essentially reduced to the actual measurement time which is required for the testing operation, for example for testing the degree of uniformity of the tire. With modern machines it is possible to effect tire uniformity testing in a period of an order of magnitude of between 15 and 25 seconds, depending on the tire size and depending on whether the test run involves rotating the tire in two directions of rotation thereof. It will be seen, therefore, that with regard to a continuous testing procedure, and in particular for testing tire uniformity, it is possible to achieve a considerable reduction in the cycle time insofar as that time is now restricted essentially only to the period of time involved in carrying out the actual measurement procedure.

Furthermore, the forces and moments which are measured in the testing procedure exhibit adequate correlation with respect to the forces involved in operation of the tire in an on-road situation as both the tire and also the inflation air thereof can be heated to the temperatures which occur in normal driving practice. It is possible to provide for a controlled temperature setting by monitoring the temperature of the air in the interior of the tire during the test run.

In in accordance with another aspect of the invention, the foregoing and other objects are attained by an apparatus for the controlled inflation of a pneumatic tire with compressed air in a tire testing machine comprising a compressed air conduit for supplying air from a stationary compressed air source into the interior of the tire, and use of a control means for controlling the air supply in dependence on an air pressure detected by a pressure sensor. Arranged between the compressed air source and the interior of the tire in the compressed air conduit is a temperature setting means for setting the temperature of the compressed air as it passes through the compressed air conduit. In addition, disposed in the interior of the tire is a temperature sensor connected to a control means for actuation of the temperature setting means in dependence on the temperature detected by the temperature sensor. The temperature sensor may be disposed in a pressure chamber which, in the case of a tire uniformity testing machine, is a chamber or volume defined by the interior of the tire and first and second measuring rim portions on to which the tire to be tested is fitted for the testing operation.

The temperature sensor in such an apparatus may project freely into the above-mentioned pressure chamber and more particularly into the interior of the tire to be tested. It is also possible as an alternative, however, for the temperature sensor, by way of its temperature-sensitive surface, to be brought into direct contact with an inside surface of the tire to be tested, thus providing for direct temperature measurement and accordingly affording direct temperature monitoring of the tire material for the testing operation.

By virtue of that apparatus structure it is possible to provide for a preselected temperature in the interior of the tire when inflating same. It is also possible to provide information about the respective current temperature in the interior of the tire, and to afford regulated preheating of the air for inflating the tire. The test run is then carried out at a preselected test run temperature. It is also possible to provide for uniform heating of the tire from the outside and from the inside.

Further objects, features and advantages of the invention will be apparent from the following description of a preferred embodiment.

BRIEF DESCRIPTION OF THE DRAWING

The single FIGURE of the accompanying drawing is a diagrammatic view, partly in section, of an embodiment of an apparatus according to the invention.

DESCRIPTION OF THE PREFERRED EMBODIMENT

Referring to the drawing, it should first be noted that shown therein are only the components required for understanding the invention, in a tire testing machine and in particular a tire uniformity testing machine, in which the invention may be used, by way of example. It will be appreciated that the teachings of the present invention may also be used in relation to other testing machines, for example machines for testing the operational strength of a pneumatic tire.

Looking therefore at the drawing, reference numeral 1 therein identifies a pneumatic tire and more particularly a vehicle tire to be tested. In order to carry out the testing operation, the pneumatic tire 1 is mounted between first and second measuring rim portions 15 and 16 which suitably hold the tire in position. In the illustrated arrangement, the one measuring rim portion 15 is connected to a rotary spindle 24 and is non-displaceable in the direction of the axis of the spindle 24, as indicated at A. On the other hand the second measuring rim portion 16 is displaceable on a guide cylinder member 14, in the direction of the axis A of the spindle. The testing apparatus may be arranged vertically or horizontally, according to specific circumstances and requirements.

The illustrated tire uniformity testing machine also includes a pressure wheel or test drum 2 which provides a peripheral test surface. During a testing run, the tire 1 to be tested bears against the testing drum 2 at an area which is referred to as the tire contact patch, and the tire is pressed against the testing drum 2 under a given loading which, depending on the nature of the tire to be tested, may be up to 1000 kp or more. The tire 1 and the testing drum 2 roll against each other by appropriate rotary movement thereof.

The illustrated machine further includes a measuring arrangement 3 which is arranged on the axis of the testing drum 2, for measuring at least one of the forces and/or moments which take effect at the tire contact patch during a testing run. The measurement values are transmitted from the measuring arrangement 3 to an evaluation arrangement 4. Examples of a suitable form of measuring arrangement are to be found in Hofmann Report 89 'Automatische ReifengleichformigkeitsMessmaschine fur Pkw- und LKW-Reifentyp RGM E' ['Automatic tire uniformity measuring machine for passenger vehicle and truck tire type RGM E']. Examples of a suitable form of evaluation arrangement are to be found in Automobil-Industrie 2/71, page 89 and Hofmann news 3.

Before a test run is carried out, the tire 1 to be tested is fitted into position between the measuring rim portions 15 and 16 which are moved apart in order to permit the tire to be appropriately inserted. When the tire has been moved into the appropriate position, the measuring rim portion 16 which is the upper measuring rim portion in the drawing is moved towards the lower measuring rim portion 15, by being slid downwardly along the guide cylinder member 14. The two measuring rim portions 15 and 16 are locked together by means of a locking member 25 which is actuated by way of an actuating locking cylinder assembly 17 so that the measuring rim portions then form a measuring rim unit which carries the pneumatic tire 1 to be tested, for performance of the testing run.

The spindle 24 is rotatably supported on a mounting housing portion 20 by means of rolling bearings diagrammatically indicated at 22 and 23. The mounting housing portion 20 is suitably carried on a machine frame structure of which part is shown at 33. In other respects, the part of the tire testing machine shown in the drawing, which serves to support and actuate the measuring rim portions 15 and 16 may be of any suitable configuration, being for example of the design configuration as shown in German patent application No P 38

25 505.7 to which reference is hereby suitably directed for incorporation of the disclosure thereof.

For the purposes of inflating the pneumatic tire 1, use is preferably made of the same compressed air feed elements as are used in the above-identified application. To carry out a testing run, a pressure chamber, which in the illustrated embodiment is defined by an intermediate space or chamber 7 between the first and second measuring rim portions 15 and 16 in conjunction with the interior 6 of the tire to be tested, is filled with compressed air. The compressed air is supplied from a pneumatic installation 5 with compressed air source by way of a temperature setting device 10 which will be described in greater detail hereinafter for setting the temperature of the compressed air, a compressed air conduit 31, a compressed air duct 18 which extends in the actuating locking cylinder assembly 17, one or more openings 21 in the actuating locking cylinder 17, an annular groove 19 which is to be found in the area of the openings 21 and which is arranged internally on the spindle 24, and a compressed air duct 13 which passes through the spindle 24 between the first and second measuring rim portions 15 and 16, so that the compressed air at the appropriate temperature is thus introduced into the pressure chamber defined by the space 7 and the interior 6 of the tire.

With the exception of the temperature setting device 10 in the compressed air conduit 31, the above-defined configuration for providing for the feed of compressed air through the components of the illustrated apparatus to the interior 6 of the tire is the same as the compressed air feed arrangement illustrated in the above-identified application.

In order to provide for heating of the compressed air which is introduced into the interior 6 of the tire for inflation thereof, the above-mentioned temperature setting device 10 is provided on the compressed air conduit 31. The temperature setting device 10 includes as an essential component thereof a heating means diagrammatically indicated at 29 which serves to heat the compressed air supplied by the compressed air source included in the pneumatic installation 5, for inflating the tire carried by the measuring rim portions 15 and 16. The heating means 29 is operable to heat the compressed air to a fixedly preset value so that, prior to the beginning of the testing run, that is to say before the pneumatic tire 1 is rolled against the testing drum 2 at the tire contact patch, the interior 6 of the tire is suitably inflated with heated compressed air and the tire 1 itself is also heated to a temperature which corresponds to the temperature obtaining in a practical situation of use. In that way it is possible to eliminate or at least substantially reduce the period of time involved in heating up the tire before beginning the testing run, involving a high speed of rotation.

However, as the illustrated construction also shows, the operation of heating the compressed air used to inflate the tire 1 may also be effected under a control in dependence on the temperature obtaining in the interior 6 of the tire. For that purpose, arranged in the space or volume 7 between the two measuring rim portions 15 and 16 is a temperature sensor 8 which supplies an electrical signal corresponding to the temperature in the interior 6 of the tire or in the space 7. That signal is transmitted by way of a signal line 26 and a slip ring assembly 27 in the tire testing machine, to an evaluation and display device 11.

The electrical signal representing the sensed temperature is also passed to a control device 9. The control device 9 is further connected to an input and memory means 12 into which a reference value corresponding to a reference temperature which is to obtain in the interior 6 of the tire or in the space 7 can be inputted for storage therein. The control means 9 effects a comparison between the electrical signal representative of temperature from the temperature sensor 8 which thus indicates the actual sensed temperature, and the temperature reference value for which the input and storage means 12 also passes an electrical signal to the control device 9. The heating means 29 for heating the compressed air to be used to inflate the tire is actuated in dependence on the result of that comparison operation. In addition, to provide for temperature control in the interior 6 of the tire, the temperature setting device 10 may also have a compressed air mixing assembly 28 which includes suitable mixing valves and which is possibly solenoid-controlled. Suitable control signals are supplied by the control device 9, as indicated by the arrowed line connecting the control device 9 to the assembly 28.

In addition the compressed air mixing assembly 28 is directly connected to the pneumatic installation 5 through a pressure conduit 30 and compressed air which is unheated in the compressed air conduit 30 is passed to the compressed air mixing assembly 28. The compressed air which is heated by the heating means 29 is passed to the compressed air mixing assembly 28 by a compressed air conduit as indicated at 32.

In that way it is possible to provide for control or regulation of the compressed air for inflating the tire 1 by being introduced into the interior 6 thereof, so that the compressed air is at a predetermined temperature, both during the tire inflation phase and also during a measuring run. For monitoring purposes, the evaluation and display means 11 may display the temperature obtaining in the interior 6 of the tire.

In addition, the air pressure existing in the compressed air conduit 31 and/or in the interior 6 of the tire may be monitored by means of a pressure sensor and a corresponding signal may be passed to the control device 9. It is then possible to provide for compressed air control, as shown in the above-identified application, for which purpose the control device 9 is also connected to a closing means which is not specifically illustrated in the drawing but which is indicated by the arrowed line pointing to the right in the drawing from the control device 9 and with which the pressure chamber or space 7 can be hermetically closed off and can be opened relative to the pneumatic installation 5. The supply of compressed air from the pneumatic installation 5 by way of the compressed air conduit 31 also takes place under the control of the control device 9.

It will be appreciated that the above-described apparatus and pneumatic tire testing method performed therewith have been set forth solely by way of example and illustration of the principles of the present invention and that various modifications and alterations may be made therein without thereby departing from the spirit and scope of the invention.

I claim:

1. A method of testing a pneumatic tire comprising the steps of:

inflating the tire to a given pressure, treating the inflation air, to a temperature to pre-condition the tire, prior to being introduced into the interior of the tire, rolling the tire against a test surface at a tire contact patch, and measuring at least one of the forces and moments acting at the tire contact path.

2. A method as in claim 1, further comprising the step of monitoring the temperature in the interior of the tire during a tire testing run, and controlling the setting of the temperature of the inflation air in response to the monitored result.

3. A method as in claim 2, wherein the monitored temperature in the interior of the tire is the temperature of the air in the tire.

4. A method as in claim 1, further comprising the step of monitoring the pressure of the tire.

5. A method as in claim 1, wherein the step of treating inflation air comprises the step of heating the inflation air to a given temperature before being introduced into the interior of the tire.

6. A method as in claim 1, when used in testing the operational strength of a pneumatic tire.

7. A method as in claim 1, when used in testing the uniformity of a pneumatic tire.

8. Apparatus for controlled inflation of a pneumatic tire with compressed air in a tire testing machine comprising a stationary compressed air source, a compressed air conduit for supplying compressed air from said source to the interior of the tire to be tested, a control means for controlling the supply of compressed air in dependence on an air pressure detected by a pressure sensor, a temperature setting means arranged in the compressed air conduit between said source and the interior of the tire, for setting the temperature of the air passing in the compressed air conduit, a temperature sensor adapted to sense a temperature in the interior of the tire, and a control means connected to the temperature sensor for actuating the temperature setting means in dependence on the temperature detected by the temperature sensor.

9. Apparatus as set forth in claim 8 and further including means for supplying a reference temperature value to said control means, and wherein said control means is adapted to compare said reference temperature value and the actual temperature value and to actuate the temperature setting means in dependence on said comparison.

10. Apparatus as set forth in claim 8 wherein the temperature setting means includes a heating means for the compressed air.

11. Apparatus as set forth in claim 10 wherein the temperature setting means further includes a compressed air mixing means having a first input connected to said heating means for receiving heated air, a second input for receiving unheated air, and an output for supplying air at a set temperature to said compressed air conduit.

12. Apparatus as set forth in claim 11 wherein the heating means and the compressed air mixing means are connected to the control means for actuation thereby.

13. Apparatus as set forth in claim 8 wherein first and second measuring rim portions which are axially displaceable relative to each other and which are rotatable about a common axis are adapted to mount the tire to be tested, and wherein said measuring rim portions and the interior of the tire form a pressure chamber into which the compressed air is passed to inflate the tire.

14. Apparatus as set forth in claim 13 wherein said temperature sensor is disposed in a space between said measuring rim portions.

* * * * *

UNITED STATES PATENT AND TRADEMARK OFFICE
CERTIFICATE OF CORRECTION

PATENT NO. : 5,067,347

DATED : November 26, 1991

INVENTOR(S) : Donald C. MacGregor

It is certified that error appears in the above-identified patent and that said Letters Patent is hereby corrected as shown below:

In the Claims:

Claim 2, col. 17, line 19, please delete "rsepectively", and substitute therefor --respectively--.

Claim 7, col. 18, line 63, please delete "and".

Claim 8, col. 19, line 49, please delete "he", and substitute therefor --the--.

Claim 9, col. 19, line 54, please delete "fixed".

Claim 9, col. 19, line 55, please delete "fixed".

Claim 9, col. 19, line 55, please delete "a", and substitute therefor --an--.

Claim 9, col. 20, line 14, please delete "and".

Claim 13, col. 20, line 52, please delete "first".

Claim 13, col. 20, lines 56-59, please delete "(f) a plurality of second hydraulic rams mounted in laterally spaced relationship to be operative between the die holding means and the associated frame member;".

UNITED STATES PATENT AND TRADEMARK OFFICE
CERTIFICATE OF CORRECTION

PATENT NO. : 5,067,347

DATED : November 26, 1991

INVENTOR(S) : Donald C. MacGregor

It is certified that error appears in the above-identified patent and that said Letters Patent is hereby corrected as shown below:

In the Claims - cont'd:

Claim 14, col. 21, line 8, please delete "fixed".

Claim 14, col. 21, line 9, please delete "fixed".

Claim 14, col. 21, line 9, please delete "a", and substitute therefor --an--.

Claim 14, col. 21, line 38, please delete "mounte din", and substitute therefor --mounted in--.

Claim 15, col. 21, line 47, please delete "fixed".

Claim 15, col. 21, line 48, please delete "fixed".

Claim 15, col. 21, line 48, please delete "a", and substitute therefor --an--.

Claim 15, col. 22, line 12, after the word "use", please insert --and--.

Claim 15, col. 22, line 18, please delete "and".

Claim 15, col. 22, line 18, please delete ";", and substitute therefor --.--.

UNITED STATES PATENT AND TRADEMARK OFFICE
CERTIFICATE OF CORRECTION

PATENT NO. : 5,067,347

DATED : November 26, 1991

INVENTOR(S) : Donald C. MacGregor

It is certified that error appears in the above-identified patent and that said Letters Patent is hereby corrected as shown below:

In the Claims - cont'd:

Claim 16, col. 22, line 20, please delete "fixed".

Claim 16, col. 22, line 21, please delete "fixed".

Claim 16, col. 22, line 21, please delete "a", and substitute therefor --an--.

Claim 16, col. 22, line 48, please delete "and".

Claim 17, col. 22, line 60, please delete "fixed".

Claim 17, col. 22, line 61, please delete "fixed".

Claim 17, col. 22, line 61, please delete "a", and substitute therefor --an--.

Claim 17, col. 24, line 3, please delete "and".

Signed and Sealed this

Twenty-second Day of June, 1993

Attest:

MICHAEL K. KIRK

*Attesting Officer*  *Acting Commissioner of Patents and Trademarks*